United States Patent [19]
Cappelle et al.

[11] 3,791,226
[45] Feb. 12, 1974

[54] SLIP CLUTCH FOR TELEVISION FINE TUNING MECHANISM

[75] Inventors: Norman D. Cappelle, Arlington Heights; Henry H. Tap, Cary, both of Ill.

[73] Assignee: Oak Industries Inc., Crystal Lake, Ill.

[22] Filed: Jan. 22, 1973

[21] Appl. No.: 325,240

[52] U.S. Cl. ............................................. 74/10.8
[51] Int. Cl. ......... H03j 1/08, H03j 1/12, H03j 1/14
[58] Field of Search ........................... 74/10.8, 10.85

[56] References Cited
UNITED STATES PATENTS

| | | | |
|---|---|---|---|
| 3,466,549 | 9/1969 | Milnes | 74/10.8 X |
| 3,022,674 | 2/1962 | Cross et al. | 74/10.85 |
| 3,148,345 | 9/1964 | Moran | 74/10.8 X |
| 3,175,407 | 3/1965 | Reinwall, Jr. | 74/10.8 |
| 3,236,109 | 2/1966 | Stewart et al. | 74/10.8 X |
| 3,244,012 | 4/1966 | Ma et al. | 74/10.8 |
| 3,248,674 | 4/1966 | Fulton | 74/10.8 X |
| 3,473,392 | 10/1969 | Atkinson | 74/10.8 |

Primary Examiner—Allen D. Herrmann
Attorney, Agent, or Firm—Parker, Plyer & McEachran

[57] ABSTRACT

A slip clutch for the fine tuning mechanism of a television tuner.

The slip clutch includes a slider which may be slidably moved into position to effect fine tuning, and either a coil spring positioned about the fine tuning shaft or mating beveled surfaces positioned on the drive gear and slider.

13 Claims, 10 Drawing Figures

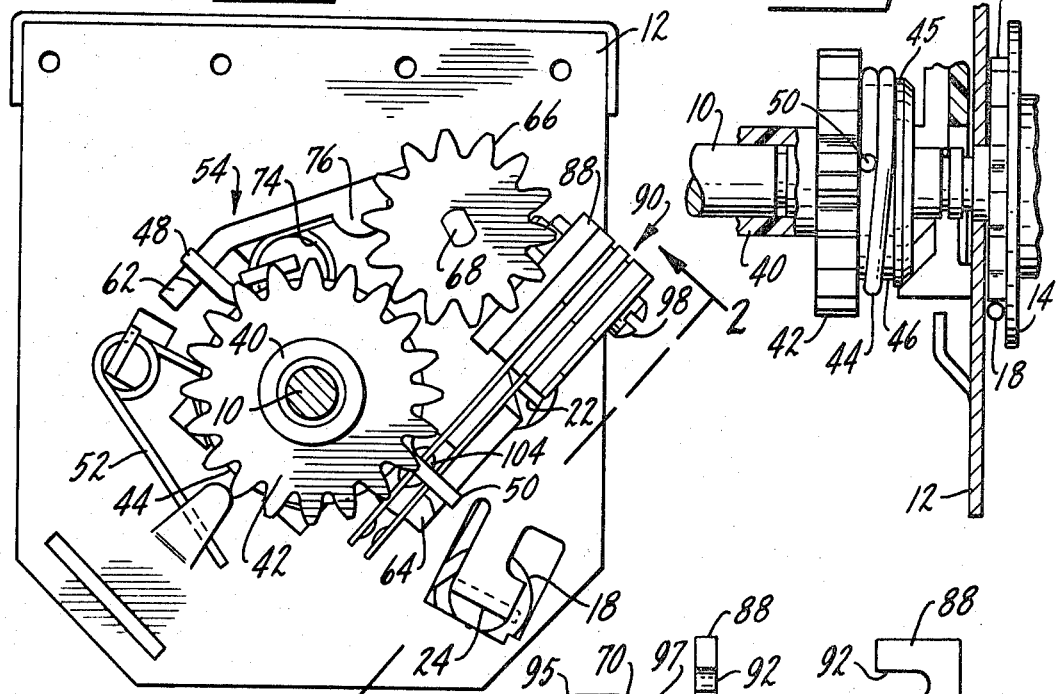
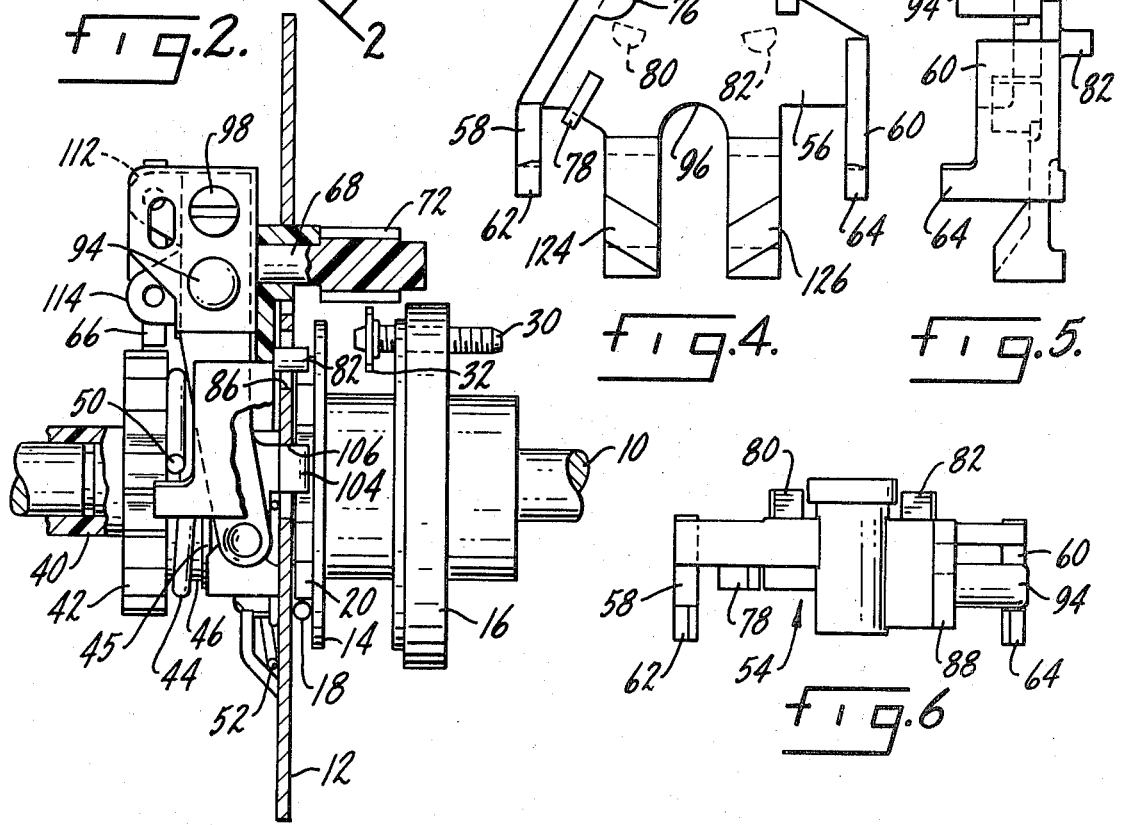

SLIP CLUTCH FOR TELEVISION FINE TUNING MECHANISM

SUMMARY OF THE INVENTION

The present invention relates to the fine tuning mechanism of a television tuner and particularly to a slip clutch arrangement of improved design with ease of manufacture.

Another object is a slip clutch that utilizes a portion of the drive gear for the clutch surface.

Another object is a slip clutch that utilizes a direct link coupling between a clutch spring and a sliding member, thus eliminating a conventional cam.

Another object is a slip clutch that utilizes a drive link applying force on the clutch spring in a direction tending to loosen the spring, resulting in a lower differential between starting and running clutch torques.

Another object is a slip clutch of a high deflection to force ratio permitting a highly predictable clutch torque with little change due to dimensional tolerance variations.

Another object is a slip clutch of a relatively large diameter with a spring that distributes its load around the clutch surface resulting in even and predictable torque with a long service life.

Other objects will appear from time to time in the ensuing specification, drawings and claims.

BRIEF DESCRIPTION OF THE DRAWINGS

FIG. 1 is a front view of a television tuner showing the fine tuning mechanism;

FIG. 2 is a sectional view along line 2—2 of FIG. 1;

FIG. 3 is a partial view of FIG. 2 with parts broken away;

FIG. 4 is a detailed view of the slider member of the fine tuning mechanism;

FIG. 5 is a side view of the slider member of FIG. 4;

FIG. 6 is a top view of the slider member of FIG. 4;

BRIEF DESCRIPTION OF THE INVENTION

Figure 7:
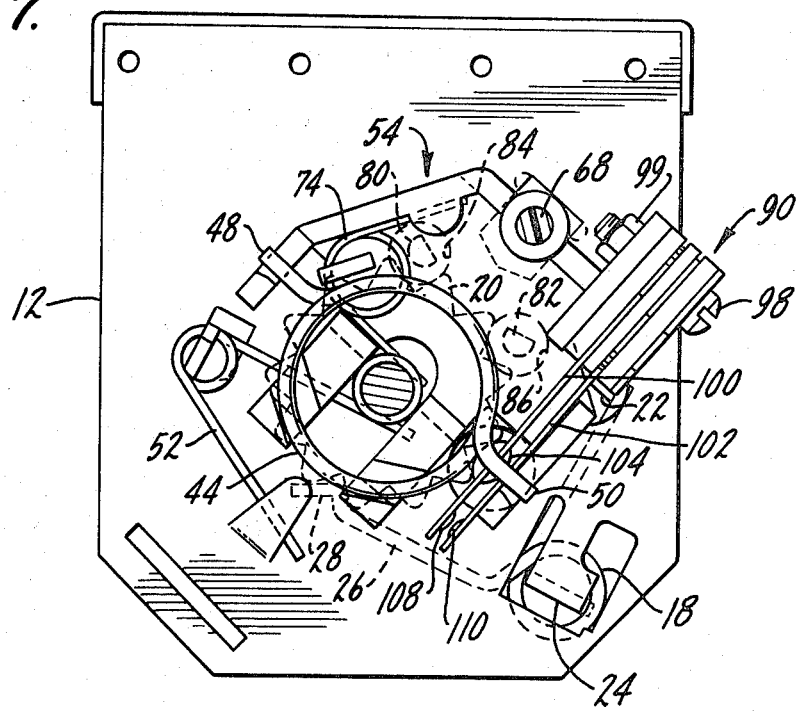
FIG. 7 is a front view of the television tuner with parts removed.
Figure 8:
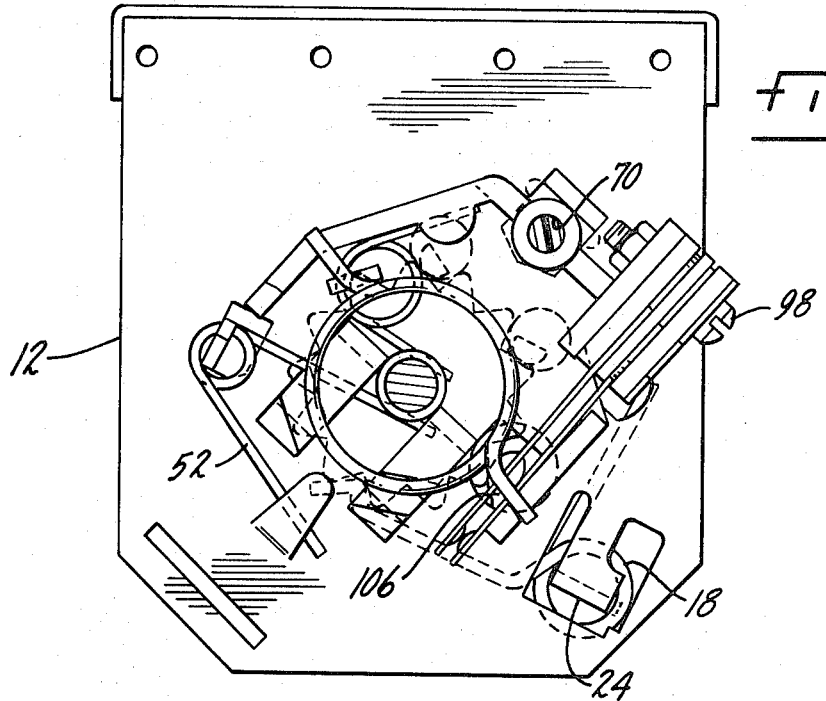
FIG. 8 is the same view as FIG. 7 with the AFC defeat and the fine tuning mechanism operated.

A television tuner conventionally includes a fine tuning mechanism and channel selection means. The channel selection means may include a channel selector shaft 10 that extends through the tuner front plate 12; an index rotor 14 mounted on the shaft 10; an oscillator rotor support 16 also mounted on the shaft 10; and a bias detent spring 18. The channel selector shaft 10 extends past the rotor support 16 into the remaining portion of the television tuner, not shown, where it may be supported and operate various rotary switch assemblies. The index or detent rotor 14 has inclined teeth 20 forming a star wheel. The bias detent spring 18 has one spring arm supported by a tab 22 on the front plate 12 (FIG. 7) and the loop or eye of the spring 18 supported by a second tab 24. The other spring arm 26 of the spring 18 has a hook 28 that engages the circumferentially arranged teeth 20 on the detent rotor 14. As the channel selector shaft 10 is rotated by a conventional knob, the spring arm 26 is displaced as the hook portion 28 moves in and out of the teeth 20, thereby providing a detent action.

The oscilator rotor support 16 attached to the shaft 10 includes fine tuning coil slugs 30 in the shape of screws that are circumferentially mounted around the support 16. There is one tuning slug 30 for each channel. These slugs or tuning screws 30 also include a gear shaped head 32 utilized to move the slug in and out of the support 16, as will be explained in detail hereinafter. The tuning slugs 30 form a portion of a conventional tuning coil which is not shown.

The fine tuning mechanism of the television tuner includes a fine tuning shaft 40 that is concentric with and free to rotate about the channel selector shaft 10. A drive gear 42 is attached to the fine tuning shaft 40 and has an axially extending portion 45 which mounts a clutch or torsion coil spring 44 within a groove 46. A bias spring 52 is mounted between the plate 12 and the channel selector shaft 10. A slider mechanism 54 includes a base portion 56 with side edges 58 and 60 that are contacted at 62 and 64 by the ends 48 and 50 of the clutch spring 44, respectively. Also mounted on the slider mechanism 54 is a fine tuning gear 66 that is engaged by the drive gear 42 and rotatably mounted in the slider by means of a shaft 68 that extends through passage 70 of the slider mechanism base 56 and the tuner plate 12. At the other end of the shaft 68, a tuning gear 72 is provided with teeth adapted to fit the head 32 of the tuning slugs 30. A slider bias return spring 74 is mounted with one spring arm under tab 76 of the slider base 56 and the eye of the spring around tab 78 of the slider base 56 and the other spring arm against the selector shaft 10. The bias return spring 74 returns the slider mechanism 54 after it has been displaced by the clutch spring 44. Bias spring 52 maintains the channel selector shaft 10 in its normal position. Projection tabs 80 and 82 are provided on the slider base 56, extending through holes 84 and 86 respectively in the front plate 12 to retain the slider mechanism 54. Projection tabs 80 and 82 also provide a kickout means to prevent gear 72 from engaging gear head screw 32 during rotation of channel selector shaft 10. A support 88 is provided on the slider base 56 to mount an AFC defeat 90 that may be provided, as will be explained in detail hereinafter. A slot 92 and a column projection 94 are provided on the support portion 88 to mount the AFC defeat 90. A large, elongated slot 96 is provided in the slider base 56 to receive the tuning shafts 10. Projection ears 95 and 97 on the slider 54 adjacent to hole 70 retain the slider.

The AFC defeat 90 may be provided on the television tuner if the tuner has an associated AFC circuit. The AFC defeat 90 provides a defeat indication to the AFC circuit during the channel selection and fine tuning operations. The AFC defeat, which may be mounted on the slider mechanism 54 by a screw 98 and a nut 99, includes spaced contact arms 100 and 102 with one of the contact arms 100 having a small bushing or cam actuator 104 that extends or projects through a hole 106 in the front plate 12. Each contact arm 100 and 102 has a contact 108 and 110, respectively, at its end. The bushing 104 is positioned to be adjacent the teeth 20 of the index or detent rotor 14. Referring to FIG. 7; as the index rotor 14 rotates, the bushing 104 will move up the inclined side of one tooth 20 of the rotor. This movement of the bushing 104 will cause contact arm 100 to close against contact arm 102. The AFC defeat 90 includes connection tabs 112 and 114 for the contact arms 100 and 102 to provide for the connection of suitable wiring means to the AFC circuit.

As the channel selector shaft 10 is rotated by means of a TV viewer turning a suitable knob, the bushing or cam actuator 104, which is positioned between the teeth 20 of the index rotor 14, moves up the inclined side of one tooth which moves contact arm 100 toward contact 102 to provide a contact closure. The open position of the contacts 108 and 110 correspond to the AFC circuit being in the normal operating mode while the closed position of contacts 108 and 110 corresponds to the AFC defeat position. It can be seen that the bushing 104 will move up the inclined portion of a tooth 20 as the channel selector shaft 10 is rotated, regardless of clockwise or counterclockwise rotation.

As the channel selector shaft 10 is rotated between channels, the tuning slug 30 for each channel is positioned near the tuning gear 72. Since the fine tuning of a television channel is done for a particular channel and the fine tuning operation has no effect on the other channels, each channel must be fine tuned individually. Therefore, when the fine tuning is not being performed, the tuning gear 72 must be biased away from the tuning control coil screws 30. Normally, the drive gear 42 is in such a position that the tuning gear 72 of the slider mechanism 54 is not in contact with any one of the gear shaped heads 32 of the tuning coil slugs 30. As the fine tuning shaft 40 is first rotated, it will turn the drive gear 42 so as to bring either of ends 48 or 50 of spring 44 in contact with the slider base at 62 or 64. If the fine tuning shaft 40 is rotated clockwise, the end 50 of clutch spring 44 will contact the slider base portion 56 at 64. Alternatively, if the fine tuning shaft 40 is rotated counterclockwise, the end 48 of the clutch spring 44 will contact the slider base portion 56 at 62. In either case, the slider mechanism 54 is moved to a position in which tuning gear 72 contacts the gear head portion 32 of the tuning coil slug 30 for the particular selected channel. Further rotation of the fine tuning shaft 40 causes drive gear 42 to engage and turn the fine tuning gear 66. Since the fine tuning gear 66 and the tuning gear 72 are connected by shaft 68, the tuning gear 72 rotates, causing the tuning coil slug 30 to turn. The direction of rotation of the tuning slug 30 is determined by the viewer rotating the fine tuning shaft 40 in a clockwise or counterclockwise direction. The fine tuning shaft 40 is thus rotated by the viewer to obtain the desired tuning. The clutch spring 44, in cooperation with the drive gear 42, functions as a slip clutch in that further movement of the fine tuning shaft 40 after either spring end 48 or 50 contacts the slider mechanism 54 merely turns the drive gear 42 within the clutch spring 44. The tuning gear 72 and tuning coil slug 30 are held in engagement during fine tuning by the frictional resistance of the sliding clutch spring 44 that acts on the slider member 54 to overpower the slider return spring 74 that would otherwise disengage the gears.

During the fine tuning operation, the AFC defeat 90 is also operated. As the slider mechanism 54 moves into position to rotate the slug 30, the bushing 104, moving with the slider, moves up the inclined side of a tooth 20 of the rotor 14. The movement of the slider mechanism 54 to perform fine tuning is sufficient to cause the bushing to move far enough on the inclined surface of a tooth 20 to cause closure of the contact arms 100 and 102. The AFC defeat closure remains until the viewer releases the fine tuning shaft 40.

The spring 44 distributes its load around the clutch surface which is the groove 46 of the axial extending portion 45 of the drive gear 42. It should be noted that the drive link, the slider contacted at 62 or 64, applies a force on clutch spring 44 in a direction tending to loosen the spring on the clutch. Due to inertia, the static or starting clutch torques are typically higher than dynamic or running torques. By applying force to the clutch spring 44, tending to loosen it, the starting torque is lowered and the differential between starting and running clutch torques is reduced.

The clutch is easily assembled by the use of a single tool expanding the clutch spring 44 into the groove 46. The spring 44 may be made from music wire spring material resulting in a high deflection to force ratio permitting a highly predictable clutch torque with only slight change due to dimensional variations. The use of the molded thermal plastic clutch or extension 45 further increases the predictability of torque characteristics and also results in increased service life of the slip clutch. It should also be noted that having spring end 48 or 50 of clutch spring 44 directly contacting the slider mechanism 54 eliminates the requirement of any cam or coupling members. This also increases service life and allows for ease of manufacture.

Figure 9:
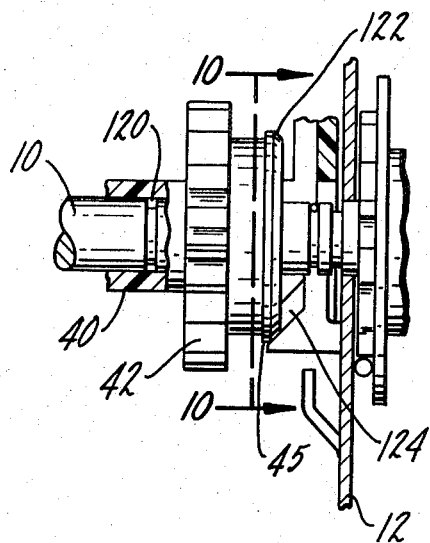
FIG. 9 is a view similar to FIG. 2 showing a modified form of the invention.
Figure 10:
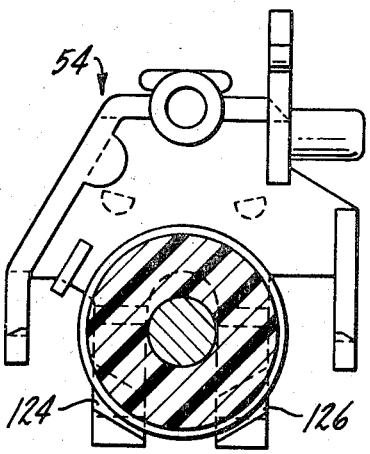
FIG. 10 is a sectional view along line 10—10 of FIG. 9.

The slip clutch fine tuning may be easily converted to a push to fine tune arrangement as shown in FIGS. 9 and 10. To accomplish the conversion, a retaining clip, not shown, that fits in slot 120 of the channel selector shaft 10 is removed, along with the clutch spring 44. The fine tuning shaft 40, after the removal of the retaining clip, is now free to move axially. The extending portion 45 of the drive gear 42 includes a beveled surface 122 adjacent the slider member 54. The slider includes beveled ramp surfaces 124 and 126 adjacent the beveled surface 122. The beveled edge 122 of the drive gear 42 moves in a cam relationship with the ramp surfaces 124 and 126 of the slider 54 when the fine tuning shaft 40 is moved axially inward towards the tuner plate 12. The slider member 54 moves to a position in which tuning gear 72 contacts the gear head portion 32 of the tuning coil slug 30 for the particular selected channel.

The movement of the slider mechanism 54 is identical to that during operation of the rotary fine tuning arrangement involving the clutch spring 44. After the fine tuning shaft 40 has been pushed axially, rotation of the fine tuning shaft causes drive gear 42 to turn the tuning coil slug 30 by means of tuning gear 72. The channel selection by means of rotating the channel selector shaft 10 is accomplished identically whether the rotary fine tuning or the push to fine tune arrangement is utilized. Since the slider mechanism 54 moves identically whether the clutch spring 44 contacts the slider or the beveled surface 122 of drive gear 42 contacts the slider, the AFC defeat closure also operates identically with either fine tuning arrangement. As the beveled surface 122 moves into a cam relationship with the ramp surfaces 124 and 126, the bushing or cam actuator 104, moving with the slider, moves up the inclined side of a tooth 20 of the rotor 14. The movement of the slider mechanism 54 as the push to fine tune mechanism is operated is sufficient to cause the bushing to move far enough on the inclined surface of a tooth 20 to cause closure of the contact arm 100 and 102. The AFC defeat closure remains until the viewer releases the fine tuning shaft 40.

Whereas the preferred form of the invention has been shown and described herein, it should be realized that there may be many modifications, alterations and substitutions thereto.

We claim:

1. In a television tuner, a frame, a channel selector shaft mounted in said frame, fine tuning means mounted on the frame including a rotatable tuning member for each channel,
   means for adjusting each rotatable tuning member, normally biased away from said fine tuning members, said adjusting means being slidably movable on said frame toward and away from said fine tuning members,
   and fine tuning operating means concentric with said channel selector shaft including a coil spring having portions thereof positioned to contact said adjusting means upon rotation of said operating means.

2. The structure of claim 1 further characterized in that initial rotation of said operating means rotates said coil spring with one of said coil spring portions contacting said adjusting means to slidably move said adjusting means towards said fine tuning members.

3. The structure of claim 2 further characterized in that further rotation of said operating means expands said coil spring to cause slip between said spring and operating means.

4. The structure of claim 3 further characterized in that further rotation of said operating means with said coil spring slipping operates said adjusting means to rotate said rotatable tuning member for the channel selected.

5. The structure of claim 4 further characterized in that said coil spring is mounted concentrically with said channel selector shaft on said operating means.

6. The structure of claim 1 further characterized in that one of said coil spring portions will contact said adjusting means when said operating means are rotated in a clockwise manner and another of said portions will contact said adjusting means when said operating means are rotated in a counterclockwise manner.

7. The structure of claim 6 further characterized in that said adjusting means includes a slider slidably mounted on said frame and positioned for contact by said coil spring portions.

8. The structure of claim 7 further characterized in that said adjusting means includes a tuning gear, said tuning gear and said slider being mounted on opposite sides of said frame, said tuning gear rotating said fine tuning member of the selected channel upon rotation of said operating means.

9. The structure of claim 8 further characterized in that said operating means includes a fine tuning rotatable shaft, said coil spring being mounted concentric with said shaft.

10. The structure of claim 9 further characterized in that said operating means includes a drive gear that rotates with said operating means, said adjusting means including a driven gear, said drive gear driving said driven gear upon rotation of said operating means.

11. The structure of claim 10 further characterized in that said driven gear is connected to said tuning gear, rotation of said driven gear causing rotation of said tuning gear.

12. The structure of claim 11 further characterized in that said adjusting means includes a shaft that connects said driven gear and said tuning gear and in that said driven gear and said tuning gear are positioned on opposite sides of said frame.

13. In a television tuner, a frame, a channel selector shaft mounted in said frame, fine tuning means mounted on the frame including a rotatable tuning member for each channel,
    a fine tuning drive gear concentrically mounted on said channel selector shaft, a slider slidably mounted on said frame and mounting a driven gear in engagement with said fine tuning drive gear, means fixed to said driven gear for adjusting said tuning members and normally biased away from said tuning members,
    drive means concentric with and axially movable relative to said channel selector shaft and fixed to said fine tuning drive gear, said drive means and slider each having mating beveled surfaces,
    axial movement of said drive means into engagement with said slider slidably moving said slider and adjusting means into engagement with one of said tuning members, such that rotation of said drive gear rotates said driven gear which in turn causes said adjusting means to adjust said fine tuning member.

* * * * *